May 5, 1953   M. B. LUCKER   2,637,523
LIFTING JACK
Filed Sept. 14, 1950   3 Sheets-Sheet 2
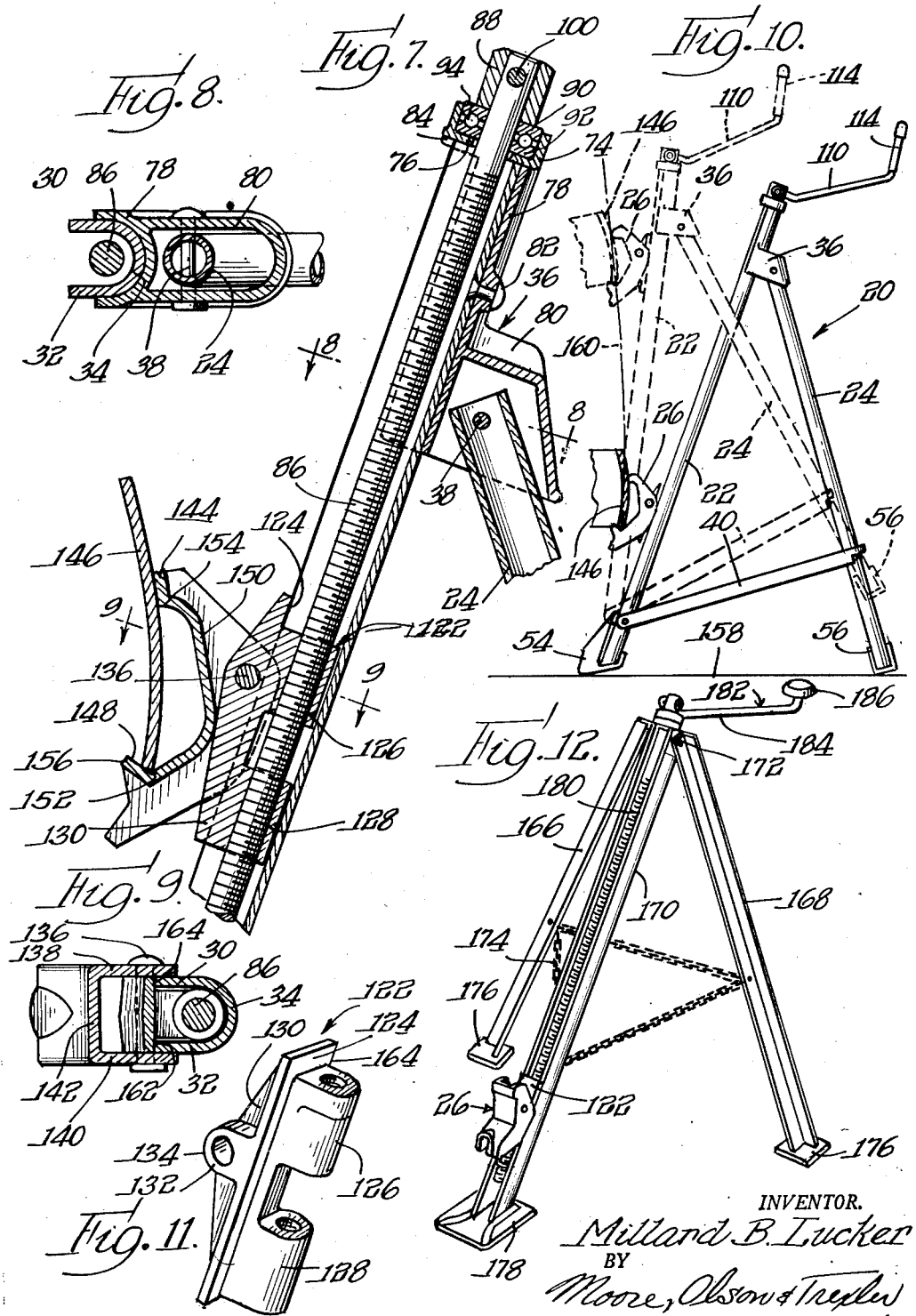
INVENTOR.
Millard B. Lucker
BY
Moore, Olson & Trexler
Attys.

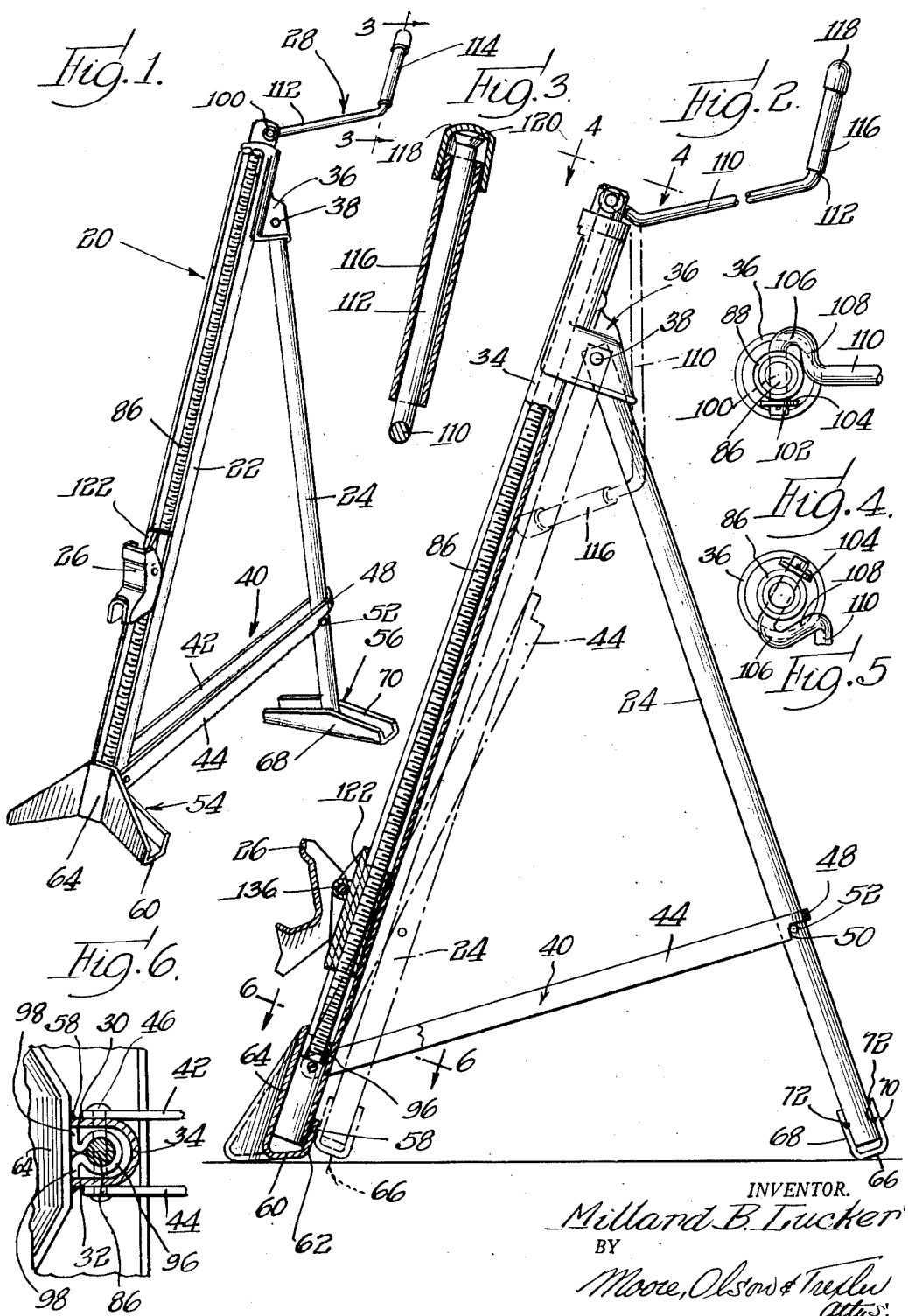

May 5, 1953 M. B. LUCKER 2,637,523
LIFTING JACK
Filed Sept. 14, 1950 3 Sheets-Sheet 3
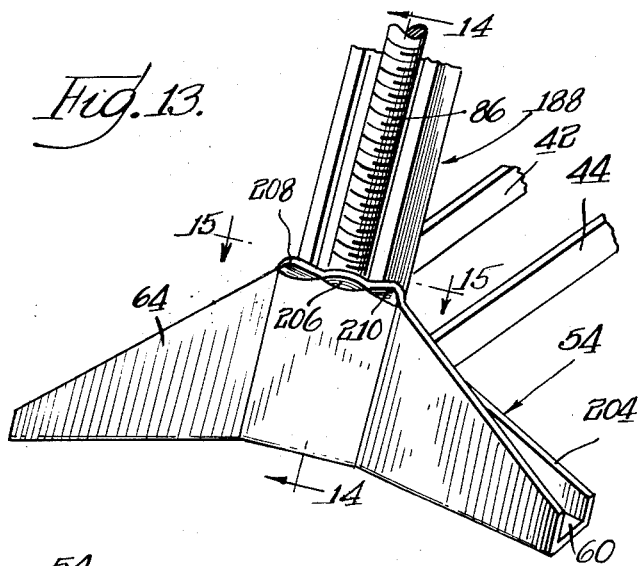
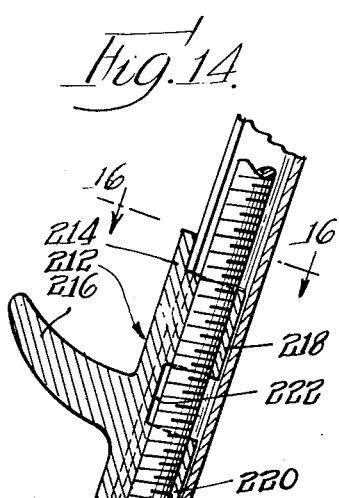
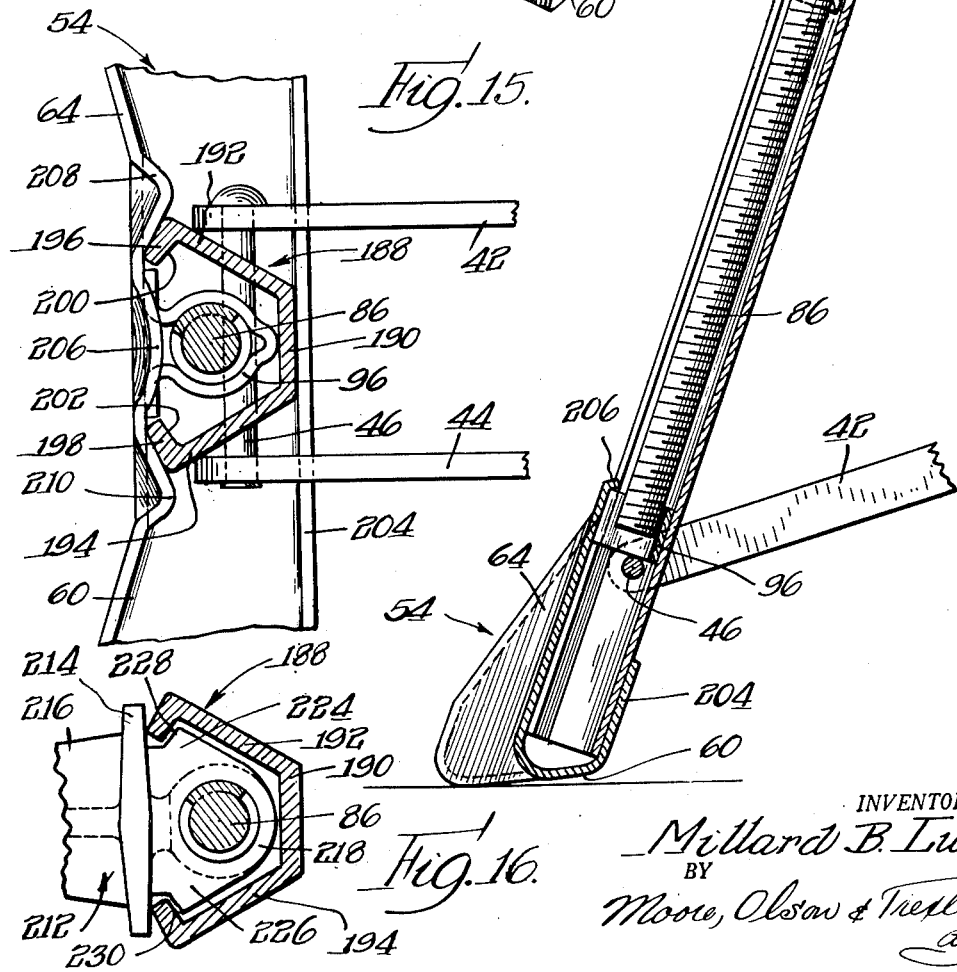
INVENTOR.
Millard B. Lucker
BY
Moore, Olson & Trexler
attys.

Patented May 5, 1953

2,637,523

UNITED STATES PATENT OFFICE 2,637,523

LIFTING JACK

Millard B. Lucker, St. Joseph, Mich., assignor to Auto Specialties Manufacturing Co., St. Joseph, Mich., a corporation of Michigan Application September 14, 1950, Serial No. 184,779

14 Claims. (Cl. 254—99)

This invention relates to lifting jacks and more particularly to bumper jacks for use with automobiles, trucks, and similar vehicles.

This application is a continuation in part of an application entitled "Automobile Jack," Serial Number 63,367, filed December 3, 1948.

Lifting jacks of the type set forth in this application have particular utility for use with automobiles, trucks, and other vehicles of the same general class for lifting the vehicle for repair and service purposes such as for changing tires. A convenient point at which to attach the load lifting member of the jack to the vehicle is the bumper and the jack of the present application is particularly adapted for such use. Jacks intended for this purpose must be capable of engaging the low set bumpers used today and must be capable of lifting the engaged end of the vehicle a substantial height in order to permit removal and application of the low pressure type of tires used today. In addition, the jack must be easily and conveniently operated without causing injury to the clothing or person of the operator. Another important characteristic of jacks for use in the application contemplated is that the jack would be capable of being folded into a compact package for storage in trunks and other compartments of relatively small area.

When lifting one end of an automobile, using a jack such as the type of the present application, the engaged bumper is in effect rotated about the opposed set of wheels whereby to produce problems in engagement between the load rest of the jack and the bumper. More specifically, it is desirable to have two-point contact at all times between the load rest and the bumper regardless of the position of the vehicle vertically. In many forms of load rests used heretofore, proper two-point contact was obtained when the bumper was in the lowered position, but due to the rotation described above, the bumper would move out of engagement with the load rest whereby to produce a relatively unstable one-point contact between the bumper and the load rest.

In connection with the foregoing special problems are encountered when it is desired to lift one end of a vehicle when the vehicle is positioned on an inclined surface. In all types of jacks and particularly in those types in which the load lifting member normally moves in a direction upwardly and away from the vehicle, it is desirable to raise the automobile with the brakes thereof released so that the automobile can roll toward the jack and follow the load lifting member as it moves up and away from the original position on the automobile. It is apparent that if the vehicle is positioned on an inclined surface, it will be necessary to lock the brakes before lifting the desired end of the vehicle in order to insure that the vehicle will not get out of control. With the brakes locked, the bumper engaged by the jack rotates about an axis adjacent the opposite set of locked wheels in a direction upwardly and away from the jack. Since the load lifting member is itself moving upwardly and away from the original position of the car, it is apparent that either the car or the jack must move if contact is to be maintained between the bumper and the load rest. It has ben found that as lifting progresses the jack of necessity must tilt forwardly unless it slips upon the supporting surface. Again for safety purposes, it is desirable that the jack not slip with respect to the support surface and, accordingly, the jack must tilt forwardly. With various load rests used heretofore, the load rest and bumper were not maintained in two-point contact under these conditions and accordingly a relatively unstable and dangerous condition results.

It is therefore an important object of the present invention to provide an improved lifting jack of the type set forth; more specifically, it is an object of the invention to provide an improved jack which is more satisfactory and simple in operation and which can be easily folded into a compact form for storage.

Another object of the invention is to provide in a lifting jack of the type described, an improved handle structure which facilitates operation of the jack and which can be folded when the jack is not in use to a position which facilitates storage.

Yet another object of the invention is to provide in a jack of the type set forth an improved load rest; more specifically, it is an object to provide a load rest for bumper jacks which positively firmly grips and supports bumpers.

Still another object of the invention is to provide an improved load rest in jacks of the type described, the load rest maintaining two-point contact with the associated bumper at all positions during the lifting and lowering of the bumper.

A further object of the invention is to provide in multi-legged jacks including a threaded rod an improved mounting for the legs and the threaded rod.

A still further object of the invention is to provide in the jacks of the type in which the load lifting member usually travels upwardly and away from the associated vehicle, an improved load rest and leg construction which permits the jack to be used with safety and ease on an automobile parked on inclined surfaces.

A further object of the invention is to provide an improved manner of attaching a supporting foot to a jack structure and an improved manner of mounting the threaded rod in the jack.

These and other objects and advantages of the invention will be better understood when taken in connection with the accompanying drawings. In the drawings wherein like reference numerals have been used to indicate like parts throughout:

Figure 1 is a perspective view of a vehicle lifting jack made in accordance with and embodying the principles of the present invention;

Figure 2 is an enlarged side view of the jack shown in Figure 1, a portion of the load lifting mechanism being shown in cross section to better illustrate the structure thereof, the folded position of the various parts being shown in dot and dash lines;

Figure 3 is an enlarged view of the handle shown in Figure 1 substantially as seen in the direction of the arrows along the line 3—3 thereof;

Figure 4 is a further enlarged end view as seen in the direction of the arrows along the line 4—4 of Figure 2 and illustrating the position of the operating handle in operative position;

Figure 5 is a view similar to Figure 4 but showing the handle in the inoperative or storage position;

Figure 6 is a partial view in horizontal section of the lower end of the jack shown in Figure 2 substantially as seen in the direction of the arrows along the line 6—6 thereof;

Figure 7 is a further enlarged view in vertical section of the upper end of the jack shown in Figure 2, the load rest being shown in an upper position;

Figure 8 is a horizontal section taken in the direction of the arrows along the line 8—8 of Figure 7;

Figure 9 is another horizontal section taken in the direction of the arrows along the line 9—9 of Figure 7 and illustrating the mounting and structure of the load rest;

Figure 10 is a diagrammatic view illustrating the motion of the load rest and the jack when lifting the bumper of a vehicle on which the brakes are locked;

Figure 11 is an enlarged perspective view of the member which engages the threaded rod and on which is mounted the load rest;

Figure 12 is a perspective view of another jack embodying the principles of the present invention, a three legged jack having been shown for purposes of illustration;

Figure 13 is an enlarged perspective view of the foot structure for a modified form of jack structure;

Figure 14 is a further enlarged view in vertical section as seen in the direction of the arrows along the line 14—14 of Figure 13, a load lifting member being shown in operative position on the screw;

Figure 15 is a further enlarged view in horizontal section of the structure shown in Figure 13 as seen in the direction of the arrows along the line 15—15; and Figure 16 is a cross sectional view showing the engagement between the load lifting member and the strut member, the view being taken in the direction of the arrows along the line 16—16 of Figure 14.

Referring now to the drawings and particularly to Figures 1 and 2, there is shown a two-legged bumper jack, generally designated by the numeral 20, which has incorporated therein the principles of the present invention. This type of jack is particularly adapted for use with automobiles, trucks, and similar vehicles by engaging a bumper thereof, but it is to be understood that the jack can be used in other applications. Jack 20 includes an inclined front strut member 22, an inclined supporting leg 24, a load rest 26 and an operator, generally designated by the numeral 28.

Strut member 22 is channel-shaped, and more specifically has a U-shaped cross section as illustrated in Figure 6, including a pair of longitudinally extending sides 30 and 32 which are joined by a curved bight portion 34. The leg 24 is substantially circular in cross section and is pivotally attached to strut member 22 by means of a bracket 36 which will be described in detail hereinafter, a pin 38 pivotally attaching leg 24 to bracket 36. In operative position the strut member 22 and leg 24 are inclined toward each other, or stated in another way, diverge from the pivot point at pin 38. A brace, generally designated by the numeral 40, is adapted to hold the strut member 22 and leg 24 in spread or spaced apart operative relationship. Brace 40 includes a pair of straps 42 and 44 pivotally connected at one end to strut member 22 by means of a pin 46 and are joined by a bight portion 48 at the other end thereof. Bight portion 48 is narrower than strips 42 and 44 whereby to provide a shoulder 50 adapted to engage an outwardly extending pin 52 attached to leg 24. When shoulder 50 engages the pin 52 on leg 24, the leg 24 and the strut member 22 will be locked in the spread or operative position.

To give horizontal stability to the jack structure, the strut member 22 is provided with a foot 54, and leg 24 is provided with a foot 56. Foot 54 is preferably formed of sheet metal and is attached to the strut member 22 as by welding at points 58. The supporting surface contacts foot 54 on a base portion 60 whose width at the center is slightly greater than the depth of strut member 22. The width of base portion 60 at the ends thereof is wider than at the center whereby to provide a broader base of support at base 60. Reinforcement is provided for base 60 in the form of a flange 62 formed integral therewith and aligned on the edge of bight portion 34 of strut 22. A second flange 64 is formed integral on the forwardly directed edge of base portion 60 and abuts against the edges of sides 30—32 of strut 22. It will be noted that the length of base portion 60 is substantially perpendicular to the plane defined by strut 22 and leg 24 whereby to give stability in directions perpendicular to this plane.

Foot member 56 on leg 24 is substantially channel-shaped and includes a base 66 having a pair of upstanding flanges 68 and 70 formed integral therewith. The width of base 66 is such as to accommodate leg 24 between flanges 68 and 70, flanges 68 and 70 being preferably connected to leg 24 by means of welding as at 72. The length of base 66 is also disposed substantially perpendicularly to the plane defined by strut 22 and leg 24 whereby to give lateral stability of the jack during use.

Referring now to Figure 7, the structure and function of bracket 36 will be described. Bracket 36 includes at one end thereof a substantially cylindrical hollow bearing portion 74 including a flange 76 disposed radially and inwardly therefrom. Formed integral with the bearing portion 74 is a substantially U-shaped portion 78 which extends a short distance along the upper end of strut 22. A laterally and rearwardly extending support portion 80 is attached to the lower end of portion 78 and its portion 80 which receives the pin 38 which effects the pivotal connection between bracket 36 and leg 24. A rivet 82 extends through the portion 78 in the upper end of strut 22 to fasten these two members together. Additional support is provided for the upper end of strut 22 in the form of a downwardly extending flange 84 which is attached to bearing portion 74.

Received in the channel of strut member 22 and rotatably mounted therein is a threaded rod 86. The upper end of rod 86 carries a sleeve 88 which is attached thereto in a manner to be described more fully hereinafter. A support for the upper end of rod 86 is provided in the form of a bearing including a pair of raceways 90 and 92 which have disposed therebetween a plurality of ball bearings. Sleeve 88 bears against raceway 90 and raceway 90 is received in bearing portion 74 and is supported on flange 76. An aperture in the center of flange 76 receives the depending rod 86. This mounting for the upper end of rod 86 permits free rotation of rod 86 within strut member 22 and also provides for support longitudinally of rod 86.

The lower end of rod 86 is held in position by a bracket 96 which includes a circular portion having a diameter slightly greater than the diameter of 86 and a pair of attaching flanges 98 which are suitably joined to the flange 64 of foot 54 in any suitable manner such as by welding. Bracket 96 confines the lower end of rod 86 but does permit limited lateral movement of the rod 86 within strut 22.

Rod 86 is preferably threaded throughout substantially its entire length whereby to give movement to the load rest 26 to a position immediately above foot 54 to a position contacting the flange 84 of bracket 36. The diameter of rod 86 is relatively small as can be best seen in Figure 6, but due to the improved mounting thereof, this size rod is capable of lifting and holding relatively large weights in the order of several thousand pounds.

Means is provided for manually rotating rod 86 in the form of the operator 28. Operator 28 is attached to rod 86 by means of an attachment portion 100 which extends through aligned apertures in the upper end of rod 86 and sleeve 88. One end of portion 100 has an aperture therethrough which receives a cotter pin 102 that serves to hold the attachment portion 100 in assembled relationship with rod 86. Preferably a washer 104 is disposed between cotter pin 102 and the adjacent edge of sleeve 88.

The other end of attachment portion 100 has a U-shaped bend 106 attached thereto which terminates in an abutment portion 108 extending substantially parallel or at an acute angle to the axis of attachment portion 100. The other end of abutment portion 108 has attached thereto an arm 110 which extends substantially perpendicularly to attachment portion 100 and in a direction substantially parallel to the supporting surface in the position shown in Figure 2. An angle of substantially 45° is formed between arm 110 and the plane containing attachment portion 100 and abutment portion 108.

The outer end of arm 110 has attached thereto a crank 112 which is turned upwardly and disposed at substantially a 60° angle with respect to arm 110. A handle, generally designated by the numeral 114, is rotatably and captively attached to crank 112. Handle 114 includes a sleeve 116 having an inner diameter slightly greater than the outer diameter of crank 112 and a cap member 118 which fits over the free end of sleeve 116. Referring to Figure 3, it will be seen that the end of crank 112 is peened over or widened as at 120 whereby to prevent removal of sleeve 116 from crank 112. Cap 118 also limits the distance which sleeve 116 can drop along crank 112. Cap 118 is preferably press fitted on sleeve 116 but it is to be understood that other forms and manner of attachment can be used if desired.

Handle 114 is disposed upwardly at substantially waist height when the jack is in operative position and thereby facilitates actuation by the user. By referring to Figures 2 and 4, it will be seen that the abutment portion 108 bears against sleeve 88 attached to the upper end of rod 86 and that no portion of the operator mechanism contacts the stationary portions of the jack. More specifically, the abutment portion 108 contacts only sleeve 88 which rotates with abutment portion 108 at all times. Accordingly, there is no friction encountered between the operator structure and the stationary parts of the jack. The handle 114 is freely rotatable upon crank 112 and provides for smooth and easy turning of the operator.

Another important aspect of the structure of operator 28 is shown in Figure 2 in dot and dash lines. When arm 110 is rotated about attachment portion 100, the rod 86 being held substantially stationary, the operator assumes the position shown in dot and dash lines in Figure 2. It will be noted that the arm 110 lies snugly against bracket 36 whereby to leave no outwardly protruding parts when the jack is in the folded position. This ready foldability is accomplished without sacrificing the needed length of arm 110 which gives the necessary leverage for operating the threaded rod 86.

Load rest 26 is pivoted upon and carried by a carrier member, generally designated by the numeral 122, see Figure 11. Carrier member 122 includes a plate 124 on one side of which are attached two outwardly extending bosses 126 and 128. Bosses 126 and 128 are spaced apart and are threaded to receive the threaded rod 86. The threads on rod 86 and bosses 126—128 are of the same shape and pitch whereby to cause relative movement between carrier member 122 and rod 86 longitudinally of rod 86 when relative rotating movement is imparted to these members.

Formed on the face of plate 124 opposite that on which are disposed bosses 126—128 is a laterally and substantially perpendicularly extending flange 130 having a widened portion 132 formed integral therewith. Widened portion 132 has an aperture 134 formed therein which extends in a direction transverse with respect to the length of plate 124. There is positioned in aperture 134 a pin 136 which attaches load rest 26 to the carrier member 122.

Referring now to Figures 2 and 7, it will be seen that the load rest 26 is substantially C-shaped when viewed from the side and substantially U-shaped in cross section as may be best seen in Figure 9. Load rest 26 includes a pair of side members 138 and 140 which are disposed substantially in parallelism and which are connected by a bight portion 142. The side members 138—140 have aligned apertures formed therein which receive pin 136 whereby to attach load rest 26 to carrier member 122.

Portion 142 is substantially straight in horizontal cross section and substantially C-shaped in vertical cross section. The extreme upper end 144 of portion 142 is slightly curved in vertical section whereby to conform to the shape of an associated bumper 146. The lower end of portion 142 is turned sharply upwardly whereby to form a retaining portion 148. The central portion 150 joining portions 144 and 148 is recessed rearwardly, i. e., toward the threaded rod 86 and away from the portions 144—148. The lower side of the bumper 146 is adapted to be received at the point of juncture 152 of retaining portion 148 and the central portion 150. As can be best seen in Figure 7, the distance between point 154 (the point of juncture between portion 144 and portion 150) and point 152 is greater than the distance between point 154 and the outer edge 156 of retaining portion 148. This construction insures that the bumper 146 will be grasped by the load rest 26 at all times. In addition, two-point contact is made with the bumper at all times, namely, at points 152 and 154 whereby to provide a steady and positive support for bumper 146 during the lifting and lowering operations. In order further to insure a clockwise rotation of the load rest 26 as viewed in Fig. 7, hence a secure two-point contact, it should be noted that the aligned apertures receiving the pivot pin 136 are positioned well above the lower bumper support point 54, and in fact about halfway between points 152 and 154 and above the rearmost extending portion of the web or bight portion 150 of the load rest 26. This structure also presents the rearmost portion of the bight portion 150 as a stop member which is adapted to engage the flange 130 on a carrier member 122 to limit the pivotal movement or rotation of the load rest to prevent the bumper from slipping off of the load rest.

Referring to Figures 1 and 9, it will be seen that the edge of abutting portion 144 contacting bumper 146 is smooth whereby to eliminate the possibility of scarring the finish on the surface of bumper 146 which abuts portion 144. Retaining portion 148 is preferably rounded to give greater strength thereto. A preferred material for construction for the load rest 26 is malleable cast iron but other suitable materials can be used.

There is diagrammatically illustrated in Figure 10 the manner in which the improved load rest operates when lifting a vehicle by the bumper, the brakes of the vehicle being locked, as is the case when the vehicle is on an inclined surface. There is shown in solid lines the relative positions of the bumper 146 the load rest 26, and the remainder of the jack 20 in the lowered position. It will be noted that both of the feet 54 and 56 are positioned on the supporting surface 158 and two-point contact is made between the load rest 26 and the bumper 146.

As handle 114 is turned the carrier member 122 advances upwardly along the threaded rod 86 and since threaded rod 86 is inclined with respect to the vertical away from bumper 146, carrier member 122 and load rest 26 which is attached thereto will travel upwardly and away from the original position of bumper 146. Similarly, the bumper 146 as it is raised will rotate about a point adjacent the set of wheels contacting the supporting surface 158 along the arc designated by the numeral 160 and will in effect move upwardly and away from the original position of the load rest 26. Accordingly, if contact is to be maintained between load rest 26 and bumper 146, the jack 20 must tilt to the position shown in dotted lines. It will be noted that the load rest 26 must rotate or pivot with respect to the carrier member 122 if two-point contact is to be maintained between load rest 26 and bumper 146 as the bumper 146 is lifted. If load rest 26 was not pivotally mounted upon carrier member 122, the two-point contact between load rest 26 and bumper 146 would not be maintained and instead a one-point contact condition would be attained which is inherently unstable as compared with the two-point contact condition. It is also to be noted that the broad forward foot 54 forms a good basis of support for the jack when it is in the tilted position as shown in dotted lines in Figure 10.

Referring specifically to Figure 9, an important advantage of the structure of carrier member 122 will be explained. As a load is lifted by the load rest 26, a force will be applied to the jack, this force being directed substantially downwardly and rearwardly toward leg 24. The laterally extending rear edges 162 and 164 of plate 124 bear against the outwardly extending edges of the flange members 30—32 of strut 22. As a result the greater portion of the load is transmitted from the load rest to carrier member 122 and then to the strut member 22 whereby to relieve the load on the relatively small threaded rod 86. By means of this construction, a smaller diameter and therefore less expensive rod 86 can be utilized to lift a given load.

There is shown in Figure 12 a three-legged jack embodying the principles of the present invention. This jack includes a pair of rearwardly disposed legs 166 and 168 which are substantially L-shaped in cross section. The upper ends of legs 166—168 are pivoted to a strut member 170 as at 172 and the legs 166—168 and the strut member 170 are interconnected by means of flexible extension limiting means 174, a preferred example of such a limiting means being a chain. The lower ends of the legs 166—168 and strut 170 are provided with feet 176 and 178.

Mounted in strut member 170 is a threaded rod 180 whose structure and function is substantially the same as that of rod 86. Attached to the upper end of rod 180 is an operator 182 including a crank 184 and rotatable handle 186. The structure of crank 184 is substantially the same as the structure of the corresponding member in Figures 1 through 11. Handle 186 is preferably in the form of a circular knob which is rotatably attached to the outwardly extending end of crank 184.

Mounted on rod 180 for relative movement therealong is a carrier member 122 on which is disposed a load rest 26. Carrier member 122 and load rest 26 function in substantially the same manner as do the corresponding parts in Figures 1 through 11.

There is shown in Figures 13 through 16, an improved manner of attaching the foot 54 to its associated strut member; there is also shown a modified form of strut member and a load lifting member adapted to cooperate with this modified form of strut member. The cross sectional form of the modified strut member 188 is best seen in Figure 15. It will be noted that member 188 includes a rear wall 190 having a pair of side walls 192 and 194 which are angularly disposed therewith. Walls 192 and 194 diverge away from each other and are provided on the outer extremities thereof with inturned flanges 196 and 198. Flanges 196 and 198 lie substantially at a right angle with their respective walls and provide inwardly directed faces 200 and 202.

The front foot 54 receives the lower end of strut member 188 between its front wall 64 and its rear wall 204 and is welded thereto. The front wall 64 is provided with an inwardly directed flange 206 which is positioned between the inwardly directed edges of flanges 196 and 198. A pair of inwardly directed flanges 208 and 210 are disposed on the upper edge of wall 64 and outwardly with respect to the flanges 196 and 198. It will be seen from Figure 15 that flanges 208 and 210 in cooperation with flange 206 prohibits lateral displacement of strut member 188 with respect to the front foot 54.

Bracket 96 rests upon pin 46 and is held thereagainst by means of the inwardly turned flange 206 formed on the front wall 64 of foot 54. Referring to Figure 14, it will be seen that bracket 96 is in effect trapped between flange 206 and pin 46 thereby eliminating the necessity for additional securing means for bracket 96.

There is shown in this form of the invention a load carrying member 212, including a body 214, a forwardly directed load support 216 attached thereto and a pair of rearwardly extending bosses 218 and 220. Bosses 218 and 220 are threaded to receive rod 86 for movement longitudinally thereof when these members are rotated relative to each other. A space 222 is provided between bosses 218 and 220, this space permitting discharge of grease and dirt and also permitting the bosses 218 and 220 to be bored and threaded.

Referring to Figure 16, it will be seen that the upper boss 218 is provided with a pair of outwardly direct abutment portions 224 and 226 having bearing surfaces 228 and 230 formed thereon respectively. When a load is placed upon the load support 216 there is a tendency for the entire load support member 212 to be rotated in a counterclockwise direction as viewed in Figure 14. Boss 220 bears against the rear wall 190 of strut member 188 and boss 218 tends to be rotated away from and out of contact with the strut member 188. When this action occurs, the bearing surfaces 228 and 230 move into contact with the faces 200 and 202 formed on the strut member 188. Contact between these surfaces limits the amount of rotation of the load support member 212 and thereby limits the stress and strain imposed upon the threaded rod 88.

There has been provided a jack which fulfills all of the above objects and advantages. More particularly, there has been provided in a multi-legged bumper jack an improved operating handle structure and an improved load rest and load lifting structure. Although certain preferred examples of the invention have been shown for purposes of illustration, it is to be understood that various changes and modifications can be made therein without departing from the spirit and scope of the present invention. Accordingly, the invention is to be limited only as set forth in the following claims.

The invention is hereby claimed as follows:

1. In an automobile lifting jack including a rotatably mounted threaded rod and a carrier member threadedly mounted upon said rod for movement therealong, a substantially C-shaped relatively thin metal load rest having a substantially uniform cross sectional thickness and including a pair of substantially parallel sides joined by bight portions along the inner edge of the C, means pivotally connecting said C-shaped load rest to the carrier member, an abutment member provided by a bight portion adjacent the upper end C-shaped load rest for engaging a bumper, and a retaining member provided by the lower edge of a bight portion projecting upwardly and outwardly to provide a bumper engaging and supporting portion.

2. In a lifting jack including a rotatably mounted threaded rod and a carrier member threadedly mounted upon said rod for movement therealong, a substantially C-shaped relatively thin metal load rest having a substantially uniform cross sectional thickness and including a pair of substantially parallel sides joined by bight portions along the inner edge of the C, said sides having aligned apertures therein, a pin passing through said apertures and an aperture in the carrier member for pivotally mounting the load rest on the carrier member, an abutment member provided by a bight portion adjacent the upper end C-shaped load rest for engaging a bumper, a retaining member provided by the lower end of a bight portion and projecting upwardly and outwardly to provide a bumper engaging and supporting portion, the outer edge of said retaining member being disposed nearer said abutment member than the point of juncture between the bight portion and said retaining member, and means on said bight portion engageable with said carrier member to limit the pivotal movement of said load rest whereby to insure that the associated bumper is held by said retaining member to provide two-point contact between said load rest and the associated bumper.

3. In a jack including a lifting mechanism, a substantially C-shaped relatively thin metal load rest including a pair of substantially parallel sides and a bight portion interconnecting said sides along the entire inner edges thereof, said sides having aligned apertures formed therein, a pin passing through said apertures and a lifting member for pivotally mounting said load rest on a lifting member, an abutment member formed on said bight portion adjacent the upper end thereof for engaging a bumper, and an upwardly and outwardly projecting retaining member formed on said bight portion on the lower edge thereof to provide a bumper engaging and supporting portion.

4. In a jack including a lifting mechanism, a substantially C-shaped relatively thin metal load rest including a pair of substantially parallel sides and a bight portion interconnecting said sides along the inner edges thereof, said sides having aligned apertures formed therein, a pin passing through said apertures and a lifting member for pivotally mounting said load rest on a lifting member, an abutment member formed on said bight portion adjacent the upper end thereof for engaging a bumper, and an upwardly and outwardly projecting retaining member formed on said bight portion on the lower edge thereof to provide a bumper engaging and supporting portion, the outer edge of said retaining member being disposed nearer said abutment member than the point of juncture between said retaining member and said bight portion whereby to insure that an associated bumper has two-point contact with said load rest in all positions of the load lifting mechanism, said aligned apertures being disposed above a rearmost extending portion of said bight portion so that said rearmost portion may engage the lifting member to limit the pivotal movement of the load rest.

5. A load lifting jack comprising a substantially U-shaped strut member, a bracket member attached to the upper end of said U-shaped strut member, said bracket encircling said strut member at the upper end thereof and extending downwardly therefrom with a slot aligned with the open end of the U, a leg pivotally attached to said bracket near the lower end thereof for supporting said U-shaped strut member in operative position inclined from the vertical, a bearing member mounted on said bracket member at the upper end thereof, a threaded rod positioned in said U-shaped strut member and supported by said bearing member, a carrier member threadedly mounted on said rod for movement therealong longitudinally thereof when said rod is rotated, and a load rest pivotally mounted on said carrier member.

6. A load lifting jack comprising a substantially U-shaped strut member, a bracket member attached to the upper end of said U-shaped strut member, said bracket encircling said strut member at the upper end thereof and extending downwardly therefrom with a slot aligned with the open end of the U, a leg pivotally attached to said bracket near the bottom thereof for supporting said U-shaped strut member in operative position inclined from the vertical, a bearing member mounted on said bracket member at the top thereof, a threaded rod positioned in said U-shaped strut member and supported by said bearing member, a carrier member threadedly mounted on said rod for movement therealong longitudinally thereof when said rod is rotated, a load rest pivotally mounted on said carrier member, the upper end of said rod extending through said bearing and above the upper end of said bracket member, and an operating member mounted on the upwardly extending end of said rod for rotating said rod, said operating member bearing against only said rod and parts immovably connected thereto.

7. In a lifting jack including an upstanding elongated channel strut member, a foot member substantially channel shaped and providing front and rear walls, the lower end of the strut member being disposed between said front and rear walls and substantially in contact therewith, portions of said walls being deformed inwardly along opposed side surfaces of said channel strut member to provide means preventing lateral displacement of said strut member with respect to said foot member, means mounted within said channel strut member and other portions of said front wall projecting within said channel strut member and engaging said means for preventing displacement of said strut member with respect to said foot member in a direction longitudinally of said strut member and of said foot.

8. A lifting jack including an elongated channel shaped strut, a leg pivotally connected to said strut for maintaining said strut in substantially upright position, a pin extending transversely through said strut adjacent the lower end thereof, a brace pivoted on said pin for holding the lower end of said leg spaced from said strut, a bearing at the upper end of said strut, a threaded rod journaled in said bearing and mounted within said strut, a load lifting member threaded on said rod, means for rotating said rod to move said load lifting member substantially vertically, a member in said strut and rotatably receiving the lower end of said rod and resting on said pin, and a foot member on the lower end of said strut, said foot member having a portion extending into the channel of said strut to retain said foot member on said strut and to trap the member rotatably receiving the lower end of the rod.

9. A lifting jack, including an elongated channel-shaped strut, a bearing adjacent the upper end of said strut, a threaded rod journaled in said bearing and disposed within said channel-shaped strut, a load lifting member threaded on said rod, means for rotating said rod to move said load lifting member along said rod, a member disposed within said strut adjacent the lower end thereof and rotatably receiving and retaining a lower portion of said rod, a support member disposed within said channel-shaped strut beneath said rod receiving member for supporting said rod receiving member, and a foot member disposed on the lower end of said strut, said foot member having a portion extending into said channel above said rod receiving member to retain said foot member on said strut and to retain said rod receiving member against upward longitudinal movement within said channel-shaped strut.

10. A load lifting jack, comprising a generally channel-shaped strut, a bracket attached to an upper end portion of said channel-shaped strut, said bracket enclosing an upper end portion of said strut and extending downwardly therefrom with a slot aligned with an open side of said channel-shaped strut, a leg pivotally attached to said bracket at a point adjacent the lower end of said bracket for supporting said channel-shaped strut in an operative position, securing means above said leg for securing said bracket to said channel-shaped strut, a bearing member mounted on said bracket at the upper end thereof and overlying the upper end of the strut, a threaded rod positioned in said channel-shaped strut and supported by said bearing member, and a load lifting member threadedly mounted on said rod for movement longitudinally thereof when said rod is rotated.

11. An automobile bumper jack comprising an elongated strut having a generally channel-shaped cross section and opposed sides with relatively narrow forwardly exposed free edges bounding an elongated frontal opening, means for supporting the strut in a generally upstanding position, an elongated screw rotatably and pendantly mounted within said channel-shaped strut, means for rotating the screw, carrier means including a screw engaging portion disposed within said channel-shaped strut and threadedly engaging the screw, a plate-like portion carried by and extending in opposite directions from said screw engaging portion and overlying said free edges to cover said frontal opening, a load rest, means for pivotally mounting said load rest on said carrier means for movement about a horizontal axis, a bumper retaining member projecting upwardly and outwardly from the lower edge of said load rest, and an abutment member formed adjacent the upper edge of the load rest so that said retaining member and abutment member provide two-point contact with an automobile bumper being lifted.

12. An automobile bumper jack comprising an elongated strut having a generally channel-shaped cross section and opposed side walls with relatively narrow forwardly exposed free edges bounding an elongated frontal opening, means for supporting the strut in a generally upstanding position, an elongated screw rotatably and pendantly mounted within said channel-shaped strut, carrier means including a screw engaging portion disposed within said channel-shaped strut and threadedly engaging the screw, a plate like portion carried by and extending in opposite directions from said screw engaging portion and overlying said free edges to cover said frontal opening, a substantial C-shaped load rest including a pair of substantially parallel sides and a bight portion interconnecting said sides along substantially the entire inner edges thereof, said sides and said carrier means having aligned apertures, pin means disposed in said apertures for pivotally mounting said load rest on the carrier means, an abutment member deformed from said bight portion adjacent the upper end thereof for engaging a bumper and an upwardly and outwardly projecting bumper engaging and retaining member formed from said bight portion adjacent the lower edge thereof.

13. An automobile lifting jack, comprising an elongated strut having a generally channel-shaped cross section, an elongated screw rod having a relatively small diameter disposed longitudinally within said strut, bearing means for rotatably and pendantly supporting said screw rod adjacent an upper end thereof with the lower end of said screw rod free for lateral movement relative to said strut, load lifting means having a nut portion disposed within said channel-shaped strut and threadedly receiving said screw rod, said nut portion having outer transverse dimensions less than internal transverse dimensions of said channel-shaped strut so that said nut portion is movable laterally relative to the channel-shaped strut in all directions, a screw rod retaining member rigidly mounted within said channel-shaped strut adjacent its lower end, said screw rod retaining member having an aperture therein receiving and encircling the lower threaded end of said screw rod, said lower end of the screw rod being free of any axial support, said aperture having a diameter sufficiently large with respect to the screw rod to permit slight lateral movement of the lower end of said screw rod in all directions relative to said strut, and actuating means connected with an upper end portion of said screw rod for rotating the screw rod.

14. An automobile bumper jack, comprising an elongated strut having a generally channel-shaped cross section and opposed side walls with forwardly exposed free edges bounding an elongated frontal opening, means for supporting said strut in a generally upstanding position, an elongated screw rotatably and pendantly mounted within said channel-shaped strut, carrier means having axially spaced apart nut portions disposed within said channel-shaped strut and threadedly receiving the screw, said nut portions having exterior transverse dimensions less than the interior transverse dimensions of the channel-shaped strut so that said nut portions are movable laterally within said strut, said carrier means including an elongated plate member disposed for engagement with said forwardly exposed edges of said channel-shaped strut, a bumper engaging member on said carrier means, and means for rotating said screw to move said carrier means along said channel-shaped strut.

MILLARD B. LUCKER.

References Cited in the file of this patent

UNITED STATES PATENTS

| Number | Name | Date |
|---|---|---|
| 146,182 | Howard | Jan. 6, 1874 |
| 251,415 | Crecelius | Dec. 27, 1881 |
| 1,176,751 | Hardy et al. | Mar. 28, 1916 |
| 1,424,952 | Townsend | Aug. 8, 1922 |
| 1,474,428 | Bain | Nov. 20, 1923 |
| 2,043,479 | Greiman | June 9, 1936 |
| 2,125,493 | Foster | Aug. 2, 1938 |
| 2,230,534 | Elmer et al. | Feb. 4, 1941 |
| 2,259,789 | Akins | Oct. 21, 1941 |
| 2,274,794 | Kitchen | Mar. 3, 1942 |
| 2,505,187 | Juergens | Apr. 25, 1950 |
| 2,539,897 | Davey et al. | Jan. 30, 1951 |

FOREIGN PATENTS

| Number | Country | Date |
|---|---|---|
| 404,650 | Germany | Oct. 22, 1924 |
| 637,310 | France | Jan. 28, 1928 |